Jan. 19, 1937.  W. E. LEIBING  2,068,298

METHOD AND APPARATUS FOR OPERATING AN INTERNAL COMBUSTION ENGINE

Filed March 18, 1935

Inventor
William E. Leibing

By Strauch & Hoffman
Attorneys

Patented Jan. 19, 1937

2,068,298

UNITED STATES PATENT OFFICE 2,068,298

METHOD AND APPARATUS FOR OPERATING AN INTERNAL COMBUSTION ENGINE

William E. Leibing, Sausalito, Calif., assignor to Leibing Automotive Devices, Incorporated, San Francisco, Calif., a corporation of Nevada Application March 18, 1935, Serial No. 11,741

4 Claims. (Cl. 137—152)

The present invention relates to methods and apparatus for automatically controlling the timing of ignition and analogous factors in the operation of internal combustion engines. More particularly, the present invention relates to an apparatus for controlling the timing of ignition in an internal combustion engine in accordance with the intake pressure of the engine.

While many devices have been heretofore proposed for controlling the timing of ignition in an internal combustion engine in accordance with the intake pressure thereof, such devices have not proven satisfactory when used on an internal combustion engine embodying a governor of the type involving an auxiliary valve in the fuel intake since proper consideration has not been given to the differential of pressures as set up by the operation of the governing mechanism, and proper arrangements have not been provided to care therefor.

In overcoming the above-mentioned deficiency and in improving the prior art, it is a major object of this invention to provide an automatic spark or ignition timing control in association with a governor, the control insuring the most efficient timing of the ignition during all phases of engine operation whether or not the engine be operating under the influence of the governor.

A further object of the present invention resides in the provision of novel methods and apparatus in connection with a governor and automatic spark control means for automatically changing the influencing point within the intake of the engine on the spark control means from one predetermined point to another in accordance with the phase of operation of the governing mechanism employed.

Still a further object of the present invention resides in the provision of novel means in connection with a governor and automatic spark control means for automatically changing the influencing point within the intake of the engine on the spark control means from a point where the throttle valve is the factor controlling the pressure in the intake to a point where the governing mechanism is the factor controlling the pressure in the intake.

A further object of this invention resides in the provision of novel means in combination with an automatic spark control associated with a governing mechanism in an internal combustion engine, wherein the direct effect of pressures adjacent the throttle valve control is eliminated when the spark control is subject to pressures in the control of which the governing mechanism is a factor.

A further object of the present invention resides in the provision of novel means associated with a governor mechanism for automatically advancing the spark in an internal combustion engine in accordance with the intake pressures of the engine during the period when the throttle valve is a substantial factor in controlling the intake pressure and maintaining the spark in its advanced position after the governing mechanism becomes effective as a restriction and substantially eliminates the effect of the throttle valve upon the intake pressures.

Still a further object of the present invention resides in the provision of a novel spark controlling means which is directly responsive to the minimum manifold pressures despite the positioning of the governing means and throttle means and regardless of the phase of operation of the internal combustion engine.

Still a further object of my invention is to provide spark control means in a novel relation to a governor of the type disclosed in my copending application Serial No. 614,533 filed on May 31, 1932, wherein the elements of the governor cooperate with the controlling means for the spark control to improve the sensitivity of the latter.

Further objects of the present invention will appear as the description proceeds when taken in connection with the appended claims and attached drawing wherein:

Figure 1:
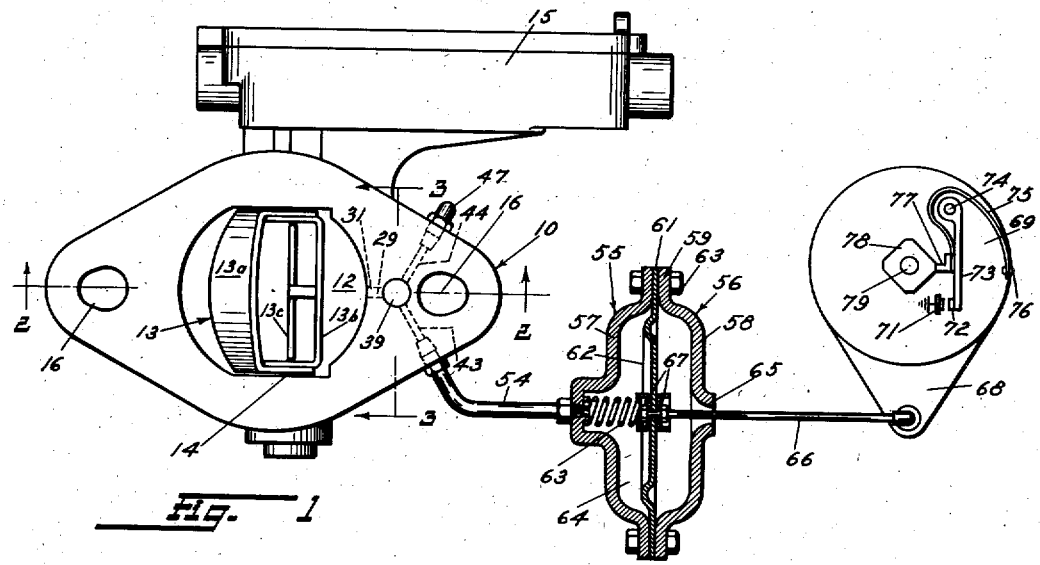
Figure 1 is a top plan view of an assembly embodying the principles of the present invention showing the governor, the various conduits in connection therewith, distributor elements of the internal combustion engine and a diaphragm operator or pressure responsive element associated therewith.

With continued reference to the drawing wherein like parts are designated by like reference characters throughout the several figures, reference numeral 10 indicates generally a governor of the type disclosed in my copending application Serial No. 614,533, filed May 31, 1932, now Patent No. 2,026,947, granted Jan. 7, 1936. Since the specific manner of operation of the governor forms no part of the present invention, only a very general description will be given in the present application thereof. For a more detailed disclosure reference may be had to the above mentioned case.

Governor 10 comprises a body portion 11 having a central passage 12. Passage 12 is designed to receive a control valve 13 shown in its open position by solid lines and its closed position by dotted lines. Valve 13 is automatically operated in response to characteristics of the flow of fuel through passage 12 to control the speed of the engine on which it may be mounted. Valve 13 is pivotally supported on shafts 14 which extend into the body where they are associated with the springs and adjusting mechanism of the governor in a casing 15 in a manner described in the aforesaid copending application. Inasmuch as the spring adjustment arrangement of the governor forms no part of the present invention, a detailed description thereof is believed unnecessary. Valve 13 comprises a curved scoop-like blade 13a and a substantially straight blade 13b mounted on opposite sides of a partition 13c. This novel construction of the valve is of importance in the present invention as will presently appear.

Apertures 16 are provided adjacent each end of body 11 to receive studs 17 or other suitable securing devices. Studs 17 are preferably of sufficient length to extend through a flange 18 provided on intake manifold 19 and thread into suitable threaded apertures 21 provided in a flange 22 of a carburetor 23. A control or throttle valve 24 is positioned in passage 25 of carburetor 23 in conventional manner. Carburetor 23 is preferably of any well known design and a detailed description thereof is not deemed necessary.

The description thus far relates to general features shown in detail in my copending application previously referred to. It is to be understood that these features are not to be considered as limiting the use of the present invention to a governor such as is disclosed in my copending application as the present description is made in connection therewith primarily for the purposes of illustration and it is to be understood that the present invention may be embodied in other types of governors.

The body 11 of the governor is formed with a passage or conduit 26 extending from face 27 to face 28 of the governor. Cross passages 29 and 31 connect conduit 26 to passage 12 above and below valve 13 and shafts 14. A sleeve 32 is preferably positioned in conduit 26 through a forced fit and is provided with an aperture 34 arranged to be aligned with cross passage 31 to thereby connect the carburetor side C of valve 13 to the interior 33 of sleeve 32.

Sleeve 32 is arranged to slidably receive a piston 35 provided with a portion 36 of reduced diameter. A suitable valve 37 is secured to or integrally formed upon the upper end of reduced portion 36. Valve 37 as shown is of general conical shape and is designed to seat upon the upper end of sleeve 32 to prevent communication between a chamber 38 formed by closing the upper end of conduit 26 by a plug 39 and the annular chamber 41 surrounding reduced portion 36. A coil spring 42 is provided for insuring leak proof contact of valve 37 with its seat under predetermined conditions.

Chamber 38 is in communication preferably at all times through cross passage 29 with the engine side I of valve 13 while chamber 41 is in communication through passages 43 and 44 respectively with nipples 45 and 46, screw-threadedly received in suitable openings in governor body 11. Nipple 46 is connected by means of a conduit 47 to a nipple 48 screw-threadedly received in a suitable aperture 49 provided in a boss 50 formed on carburetor 23. A passage 51 connects conduit 47 to the atmospheric side A of throttle valve 24. It will therefore be apparent that chamber 41 will be in communication with the atmosphere through passage 44, nipple 46, conduit 47, nipple 48 and passage 51 when throttle valve 24 is in closed position as shown in the drawing. The purpose of the above described connection will appear as the description proceeds.

Passage 43 and nipple 45 are connected by a conduit 54 to a pressure responsive operator 55 which may be of any suitable construction. In the present instance, operator 55 is of the diaphragm type and comprises a two-part casing 56 formed by complemental sections 57 and 58. Each of said sections is provided with flanges 59 between which the peripheral edge 61 of a flexible diaphragm 62 is secured by means of suitable fastening means as shown. Spring 63 is provided in connection with diaphragm 62 and section 57 to partially offset the action of the reduced pressures which are developed in the operator to insure greater sensitivity of the diaphragm.

Conduit 54 is designed to be screw-threadedly received in section 57 and casing 56 and connects annular chamber 41 to a chamber 64 formed between section 57 and diaphragm 62. The other face of diaphragm 62 is exposed to atmosphere through a central aperture 65 which is designed to freely receive a rod 66 secured to the center of diaphragm 62 by means of nuts 67 or in any well known manner. The other end of rod 66 is suitably connected to a distributor element which in the present instance is a circuit breaker lever plate 68 of a distributor 69. Plate 68 carries a grounded contact 71 which cooperates with a contact 72 carried by lever 73 pivoted at 74 on plate 68. Lever 73 is connected by means of a spring 75 to a contact 76 which is in turn connected to a primary coil of the ignition circuit in well known manner.

Block 77, carried by lever 73 is designed to contact cam member 78 rotated by shaft 79 which is driven by the engine in well known manner to time the spark or ignition for exploding the charges of the various cylinders. Movement of plate 68 accordingly advances or retards the timing of the ignition or spark in well known manner.

Since chamber 41 is maintained at atmospheric pressure when throttle 24 is in closed position, it will be readily apparent that chamber 64 due to its connection to chamber 41 through conduit 54, will also be subject to atmospheric pressure. Diaphragm 62 and spring 63 are preferably designed so that the diaphragm will be balanced under such conditions, and distributor element 68 will be maintained in a position corresponding to the retarded spark position. This position of diaphragm 62 corresponds to the retarded position of the spark or ignition and is desirable when the engine is being started and when idling and throttle valve 24 is closed.

Figures 2, 3:
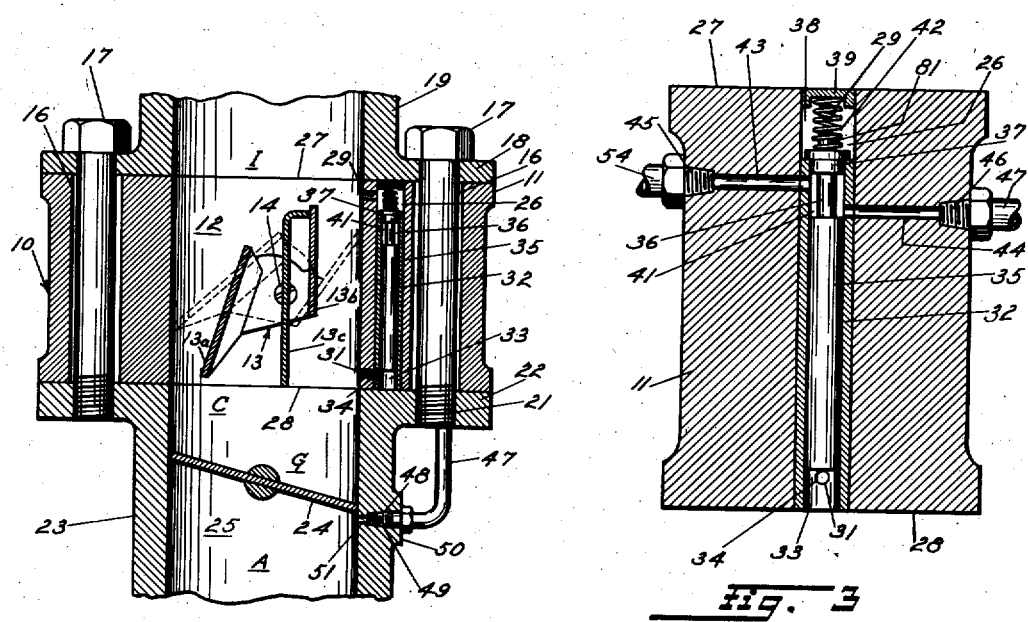
Figure 2 is a sectional view taken substantially on the line 2—2 of Figure 1 showing the governor in conjunction with a portion of the carburetor and a portion of the fuel intake and demonstrating the conduit connections thereto.
Figure 3 is a sectional view taken substantially on the line 3—3 of Figure 1 illustrating the details of the valving mechanism employed in connection with the governor and the automatic ignition control.

When the engine is to be started, the operation of the cylinders therein by the starting mechanism creates a suction or reduced pressure in the intake 19. At this time governor valve 13 is in its wide open position and the suction of the manifold is effective upon the bottom of piston 35 through cross passage 31 and chamber 33, and is also effective in chamber 38 through cross passage 29. Since the pressure at these two points acts in opposite directions and is equal, piston 35 remains in the position shown in Figures 2 and 3, and the diaphragm 62 is maintained under balanced pressure and the spark remains in retarded position. This condition exists even after the engine is running so long as the throttle valve 24 remains closed. The engine will, therefore, operate with retarded spark at idling speeds which is desirable since a smooth rather than a rough idle is thus promoted.

To accelerate the engine, throttle valve 24 is opened connecting passage 51 to the governor side G of throttle 24 which is under sub-atmospheric pressure by reason of the intake suction. Cross passages 29 and 31 are still under substantially equal pressures and piston 33 remains in its position. The sub-atmospheric pressure adjacent passage 51 is communicated to chamber 41 and chamber 64, and diaphragm 62 is moved due to atmospheric pressure through opening 65 against the action of spring 63, thus moving rod 66 and causing movement of plate 68 to advance the spark or timing of ignition.

Control of the spark through passage 51 is effective up until the point where the governor valve 13 is rotated by the fuel flow to an extent whereby it acts as a restriction to flow and sets up a differential of pressures on its upper and lower sides. At this time, the passages 31 and 51 are subjected to substantially the same pressure while the passage 29 is subjected to reduced pressure on the intake side I of governor valve 13. It will therefore be appreciated that chamber 64 under such conditions would be subjected to substantially atmospheric pressure through passage 51, conduit 47, passage 44, chamber 41, passage 43 and conduit 54 with a consequent retarding of the spark unless some provision were made to overcome this condition. In the present device when the elements reach such a position, the pressures acting upon piston 35 will become unbalanced due to the relatively higher pressure existing in chamber 33 on the bottom of piston 35 through passage 31, and the relatively low pressure existing in chamber 38 at the top of the piston 35 connected by passage 29 to passage 12. Due to this differential of pressures, piston 35 moves upwardly against spring 42 and valve 37 is opened and establishes communication between chambers 38 and 41, the body of piston 35 covering passage 44. Extension 81 of valve 37 abuts plug 39 and the movement of piston 35 is limited thereby. In addition to this function, extension 81 also centers spring 42 so that it will be maintained in its proper position.

With the elements in this position, the pressures effective upon piston 35 maintain it in raised position, and chamber 64 is subjected to intake pressures through passage 29, chamber 38, chamber 41, passage 43 and conduit 54. The spark is thus maintained in an advanced position which is desired.

From the above description it will be seen that so long as the spark is under control of the throttle valve 24 when opening there will be an advance of the spark to its maximum position. However, upon attainment of the governed speed or as soon as the governor valve begins to operate as a restriction in the conduit and sets up a differential of pressures, the spark is controlled from the intake manifold side I of the governor and the effect of the atmospheric or substantially atmospheric pressure transmitted through passage 51 is eliminated. Due to the removal of this effect, the spark control will be entirely under the influence of the intake pressure in the manifold and pressures existing at the points designated at C, G and A will have no effect whatsoever upon diaphragm 62.

Under these conditions, it will be clear that so long as the governed speed is maintained, the spark will be maintained in advanced position and there will be no danger of diaphragm 62 oscillating and causing fluttering of plates 68 with consequent intermittent advancing and retarding of the spark. It will be also noted that under such conditions, the pressure in the intake manifold forward of the governor acts directly upon the spark control, and the pressures in the carburetor adjacent the throttle and the under side of the governor are completely eliminated.

When the engine is again throttled, the governor returns to its wide open position and the intake pressure becomes effective through passage 31 and chamber 33, and spring 42 moves piston 35 and consequently closes valve 37 while opening passage 44. Chamber 41 is therefore again connected to conduit 47 and passage 51, and through passage 54, diaphragm 62 is restored to control of the throttle valve 24. As the throttling of the engine continues to idling speed the spark will be retarded accordingly.

In a preferred embodiment of the present invention as shown in Figure 1, the valving mechanism, i. e., piston 35 and its associated elements, is positioned in the governor opposite the valve blade 13b with cross passages 29 and 31 opening opposite blade 13b. This arrangement increases the sensitivity of the device since when the valve 13 goes to a position where it acts as a restriction and sets up a differential of pressures, blade 13b rotates clockwise to a point between passages 29 and 31. It thus acts as an obstruction to the fuel flow attempting to pass therethrough, as shown in the dotted line position, and consequently pressure is built up adjacent passage 31 and reduced adjacent passage 29 to an even greater extent than would normally be the case.

It is to be understood that the present invention may be applied to types of control means other than that illustrated for varying a factor of operation of an internal combustion engine as, for instance, fuel supply, valve controls and the like.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:—

1. In a flow governing mechanism, a governor body; a main passage and an auxiliary passage in said body connected by cross passages adjacent opposite ends of said main passage; a valve in said main passage; a sleeve in said auxiliary passage having an aperture aligned with one of said cross passages and terminating short of the other cross passage; a piston arranged to reciprocate in said sleeve, said piston having a portion of reduced diameter and a valve head thereon arranged to cooperate with said sleeve to form a chamber within said sleeve and a chamber immediately above said sleeve communicating with one of said cross passages; means to normally maintain said piston in a position to seal said chambers one from another, said valve being disposed between said cross passages whereby on being positioned in a flow restricting position, a differential of pressures is set up between said cross passages and said piston is moved to connect said chambers.

2. In a governing mechanism for an internal combustion engine, a fluid conduit; an auxiliary conduit connected to said first mentioned conduit at a plurality of points; a third conduit intersecting said auxiliary conduit at points between said points of connection, the points of intersection of said third conduit and said auxiliary conduit being offset axially of said auxiliary conduit; a valve in said first mentioned conduit between said points of connection; a piston in said auxiliary conduit subject to the differential of pressure between said points of connection; and a reduced portion on said piston providing an axially extending annular space to selectively connect said offset points of intersection of said auxiliary conduit and said third conduit, whereby on movement of said valve to vary the differential of pressure between said points of connection, said piston is moved to open or close one of said offset points of intersection of said auxiliary conduit and said third conduit to interrupt the connection between said offset points of intersection.

3. In a governing mechanism for an internal combustion engine, a fluid conduit; an auxiliary conduit connected to said first mentioned conduit at a plurality of points; a third conduit intersecting said auxiliary conduit at two points between said plurality of points of connection, said points of intersection of said third conduit and said auxiliary conduit being offset axially of said auxiliary conduit; a valve in said first mentioned conduit between said points of connection; a piston in said auxiliary conduit subject to the differential of pressure between said points of connection, said piston having enlarged portions adjacent its ends normally preventing communication between said plurality of points and said two offset points of intersection and a reduced portion between said end portions providing an axially extending annular space normally interconnecting said two offset points of intersection, whereby on movement of said valve to vary the differential of pressure between said points of connection, said piston is moved to close one of said offset points of intersection to interrupt the connection between said offset points of intersection and to interconnect said other offset point of intersection and the low pressure point of connection by means of said annular space.

4. In a governing mechanism for an internal combustion engine, a governor body; a main passage in said governor body; a relatively small auxiliary passage in said governor body substantially paralleling said main passage and in close proximity thereto; relatively short cross passages connecting said main passage and said auxiliary passage adjacent the opposite ends thereof; a third passage intersecting said auxiliary passage at points between said cross passages; a valve in said main passage positioned between said cross passages whereby on movement of said valve to a flow restricting position, said valve tends to set up a differential of pressures between said cross passages; and a piston in said auxiliary passage subject to the differential of pressure between said short cross passages, said piston being arranged to establish communication between the points of intersection of said third passage and to interrupt the communication between said points of intersection in response to the pressure differential between said cross passages.

WILLIAM E. LEIBING.

DISCLAIMER 2,068,298.—*William E. Leibing*, Sausalito, Calif. METHOD AND APPARATUS FOR OPERATING AN INTERNAL COMBUSTION ENGINE. Patent dated January 19, 1937. Disclaimer filed October 20, 1938, by the assignee, *Leibing Automotive Devices, Inc.*

Hereby enters this disclaimer to claims 2, 3, and 4 in said specification.

[*Official Gazette November 15, 1938.*]

1. In a flow governing mechanism, a governor body; a main passage and an auxiliary passage in said body connected by cross passages adjacent opposite ends of said main passage; a valve in said main passage; a sleeve in said auxiliary passage having an aperture aligned with one of said cross passages and terminating short of the other cross passage; a piston arranged to reciprocate in said sleeve, said piston having a portion of reduced diameter and a valve head thereon arranged to cooperate with said sleeve to form a chamber within said sleeve and a chamber immediately above said sleeve communicating with one of said cross passages; means to normally maintain said piston in a position to seal said chambers one from another, said valve being disposed between said cross passages whereby on being positioned in a flow restricting position, a differential of pressures is set up between said cross passages and said piston is moved to connect said chambers.

2. In a governing mechanism for an internal combustion engine, a fluid conduit; an auxiliary conduit connected to said first mentioned conduit at a plurality of points; a third conduit intersecting said auxiliary conduit at points between said points of connection, the points of intersection of said third conduit and said auxiliary conduit being offset axially of said auxiliary conduit; a valve in said first mentioned conduit between said points of connection; a piston in said auxiliary conduit subject to the differential of pressure between said points of connection; and a reduced portion on said piston providing an axially extending annular space to selectively connect said offset points of intersection of said auxiliary conduit and said third conduit, whereby on movement of said valve to vary the differential of pressure between said points of connection, said piston is moved to open or close one of said offset points of intersection of said auxiliary conduit and said third conduit to interrupt the connection between said offset points of intersection.

3. In a governing mechanism for an internal combustion engine, a fluid conduit; an auxiliary conduit connected to said first mentioned conduit at a plurality of points; a third conduit intersecting said auxiliary conduit at two points between said plurality of points of connection, said points of intersection of said third conduit and said auxiliary conduit being offset axially of said auxiliary conduit; a valve in said first mentioned conduit between said points of connection; a piston in said auxiliary conduit subject to the differential of pressure between said points of connection, said piston having enlarged portions adjacent its ends normally preventing communication between said plurality of points and said two offset points of intersection and a reduced portion between said end portions providing an axially extending annular space normally interconnecting said two offset points of intersection, whereby on movement of said valve to vary the differential of pressure between said points of connection, said piston is moved to close one of said offset points of intersection to interrupt the connection between said offset points of intersection and to interconnect said other offset point of intersection and the low pressure point of connection by means of said annular space.

4. In a governing mechanism for an internal combustion engine, a governor body; a main passage in said governor body; a relatively small auxiliary passage in said governor body substantially paralleling said main passage and in close proximity thereto; relatively short cross passages connecting said main passage and said auxiliary passage adjacent the opposite ends thereof; a third passage intersecting said auxiliary passage at points between said cross passages; a valve in said main passage positioned between said cross passages whereby on movement of said valve to a flow restricting position, said valve tends to set up a differential of pressures between said cross passages; and a piston in said auxiliary passage subject to the differential of pressure between said short cross passages, said piston being arranged to establish communication between the points of intersection of said third passage and to interrupt the communication between said points of intersection in response to the pressure differential between said cross passages.

WILLIAM E. LEIBING.

DISCLAIMER 2,068,298.—*William E. Leibing*, Sausalito, Calif. METHOD AND APPARATUS FOR OPERATING AN INTERNAL COMBUSTION ENGINE. Patent dated January 19, 1937. Disclaimer filed October 20, 1938, by the assignee, *Leibing Automotive Devices, Inc.*

Hereby enters this disclaimer to claims 2, 3, and 4 in said specification.

[*Official Gazette November 15, 1938.*]

DISCLAIMER 2,068,298.—*William E. Leibing*, Sausalito, Calif. METHOD AND APPARATUS FOR OPERATING AN INTERNAL COMBUSTION ENGINE. Patent dated January 19, 1937. Disclaimer filed October 20, 1938, by the assignee, *Leibing Automotive Devices, Inc.*

Hereby enters this disclaimer to claims 2, 3, and 4 in said specification.
[*Official Gazette November 15, 1938.*]